(12) United States Patent
Jeong

(10) Patent No.: US 8,333,030 B2
(45) Date of Patent: Dec. 18, 2012

(54) FISHING LINE GUIDE FOR FISHING ROD AND METHOD FOR MANUFACTURING THE SAME

(75) Inventor: Chun Jae Jeong, Daegu (KR)

(73) Assignee: Kigan Industry Co., Ltd., Gyeongsan-Si, Gyeongsangbuk-Do ( * ) Notice: Subject to any disclaimer, the term of this patent is extended or adjusted under 35 U.S.C. 154(b) by 0 days.

(21) Appl. No.: 12/892,314

(22) Filed: Sep. 28, 2010

(65) Prior Publication Data

US 2011/0010922 A1    Jan. 20, 2011

Related U.S. Application Data

(62) Division of application No. 12/344,069, filed on Dec. 24, 2008, now abandoned.

(30) Foreign Application Priority Data

Dec. 29, 2007  (KR) .................. 10-2007-0141091

(51) Int. Cl.
    *A01K 87/04* (2006.01)
(52) U.S. Cl. ........................................... 43/24
(58) Field of Classification Search ........... 43/18.1 R, 43/24
    See application file for complete search history.

(56) References Cited

U.S. PATENT DOCUMENTS

| | | | |
|---|---|---|---|
| 2,502,845 A * | 4/1950 | Hoffman ........................... 43/24 |
| 4,011,680 A | 3/1977 | Rienzo, Sr. | |
| 4,141,132 A | 2/1979 | Ohmura | |
| 4,186,508 A | 2/1980 | Howald | |
| 4,287,678 A | 9/1981 | Yamamoto | |
| 4,507,891 A | 4/1985 | Ohmura | |
| 4,682,439 A | 7/1987 | Inoue et al. | |
| 4,697,375 A | 10/1987 | Mills | |
| 5,870,848 A | 2/1999 | Ohmura | |
| 5,901,492 A * | 5/1999 | Ohmura ........................... 43/24 |
| 6,067,743 A | 5/2000 | Ohmura | |
| 6,219,954 B1 | 4/2001 | Ohmura | |
| 6,230,432 B1 | 5/2001 | Blank | |
| 6,378,240 B1 | 4/2002 | Ohmura | |
| 2005/0172535 A1 | 8/2005 | Lee | |
| 2006/0283073 A1 | 12/2006 | Omura | |

FOREIGN PATENT DOCUMENTS

| | | |
|---|---|---|
| JP | 09-233977 | 9/1997 |
| JP | 2004-024080 | 1/2004 |
| KR | 10-0257726 | 6/2000 |

* cited by examiner

*Primary Examiner* — David Parsley
(74) *Attorney, Agent, or Firm* — Lowe Hauptman Ham & Berner, LLP

(57) ABSTRACT

A method of manufacturing a fishing line guide includes a step of cutting a plate to form a guide including a holding part, a step for forming a ring-shaped holder by pressing the holding part such that a first opening is formed at one end of the holder and a second opening is formed at the other end of the holder, a step for inserting a ceramic ring into the holder to extend through the first opening and the second opening so that the ceramic ring is in contact with the inner surface of the holder in the first opening and is spaced apart from the inner surface of the holder in the second opening, and a step of filling an adhesive in a space between the ceramic ring and the inner surface of the holder in the second opening.

5 Claims, 3 Drawing Sheets

[Fig 1]
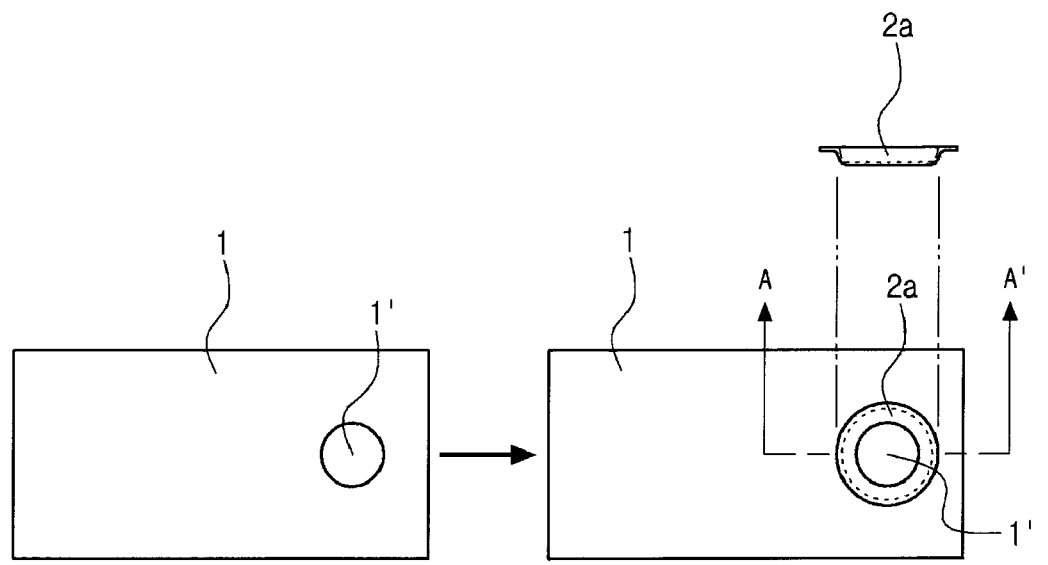
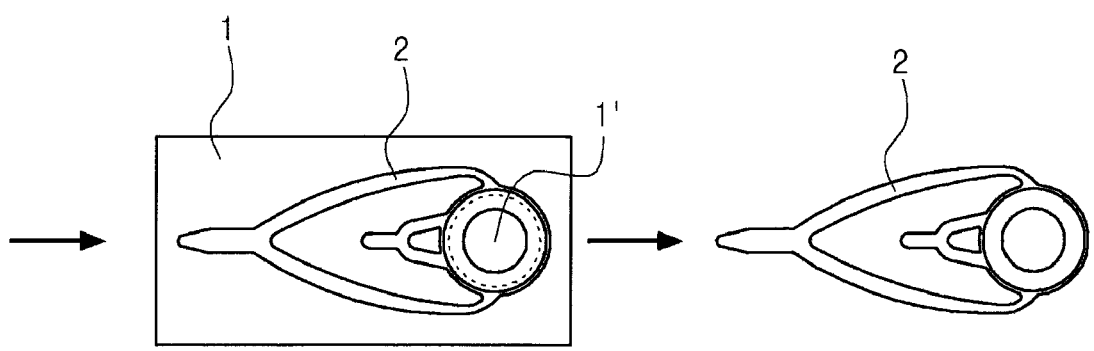
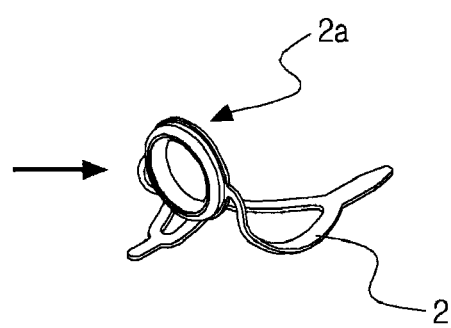

[Fig 2]
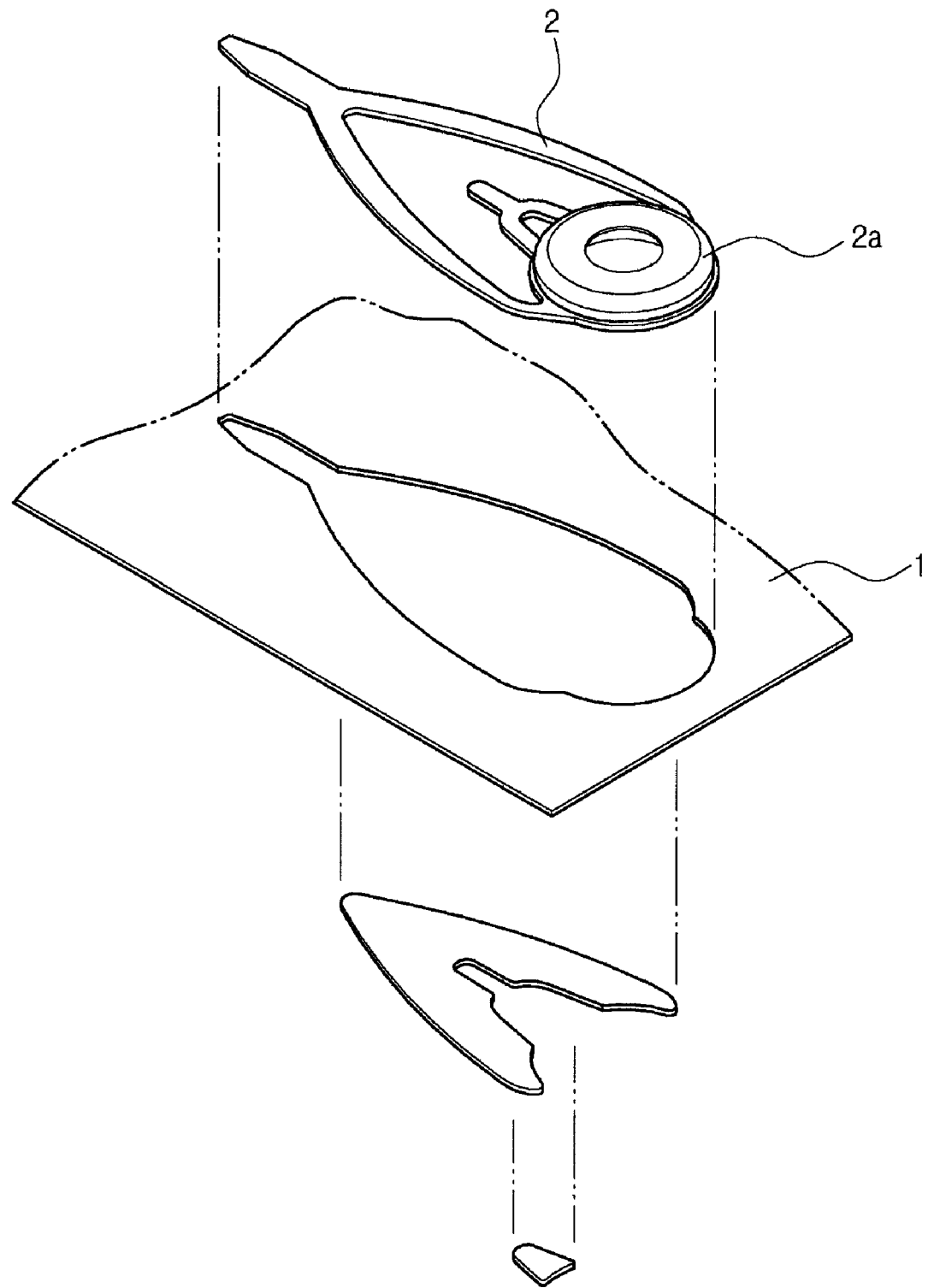

[Fig 3]
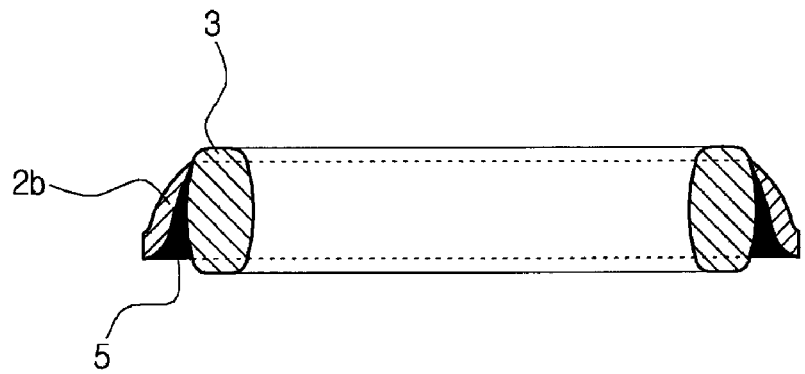
[Fig 4]
(A)
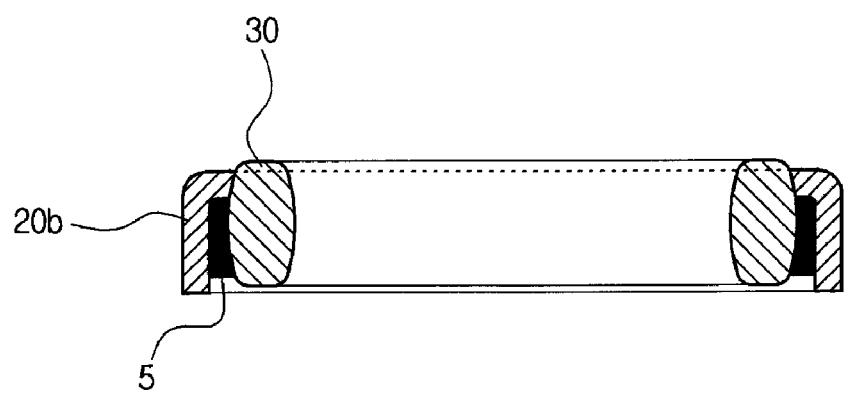
(B)
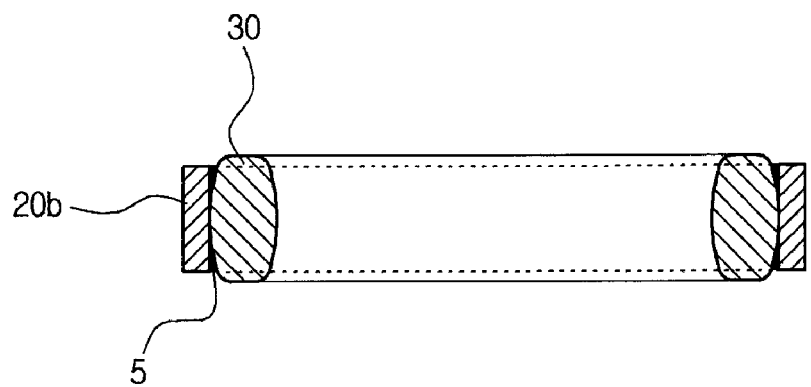

FISHING LINE GUIDE FOR FISHING ROD AND METHOD FOR MANUFACTURING THE SAME

CROSS-REFERENCE TO RELATED APPLICATIONS

The present application claims priority to Korean patent application number 10-2007-0141091, filed on Dec. 29, 2007 and is a divisional of U.S. Ser. No. 12/344,069, filed on Dec. 24, 2008, which is incorporated by reference in its entirety.

BACKGROUND ART

Generally, a fishing line guide is so configured that a steel plate is cut and made in a shape of a guide, and a ceramic ring is attached to an inner side of a hole allowing a fishing line to pass. Here, a holding part formed in a guide for attaching a ceramic ring is made in such a manner that a holder is formed in the same manner as when forming a protrusion by inwardly folding an outer portion of a holding part, and a ceramic ring is inserted, and an adhesive filler is filled between the ceramic ring and the holder and is solidified. As shown in FIGS. 4A and 4B, a lot of space is formed between an outer surface of the ceramic ring 30 and the holder 2b, so the adhesive filler 50 is needed a lot while making the holding part to look thick and tough. So, it is impossible to obtain a slim structure, and the total weight disadvantageously increases, and workability is poor.

Disclosure of The Invention

Accordingly, it is an object of the present invention to provide a fishing line guide for a fishing rod, and a method for manufacturing the same which overcome the problems encountered in the conventional art.

It is another object of the present invention to provide a fishing line guide for a fishing rod, and a method for manufacturing the same a holding part of a ceramic ring formed in a fishing line guide is pressed and expanded in an outer direction from an inner surface of a holder for thereby forming a tapered holder with an entrance where to be pressed being wider, and an exit getting narrower, and a ceramic ring is inputted into a holder, and an epoxy adhesive is injected into a gap formed between the holder and the ceramic ring and is solidified for thereby fixing the ceramic ring. So, a small amount of adhesive is needed, and solidification is fast, and a convenient process can be obtained, and a light and slim product can be more efficiently manufactured.

To achieve the above objects, the fishing line guide according to the present invention is characterized in that a tapered holder 2b is formed by pressing a holding part used for fixing a ceramic ring in an outward direction in an inner surface of a holder with an entrance being wider, and an exit getting gradually narrowed, and a ceramic ring 3 is inputted into a holder 2b, and an epoxy adhesive 5 is injected between the holder and the ceramic ring and is solidified, so a light and slim product can be efficiently manufactured.

Effects

In the fishing line guide according to the present invention, when a ceramic ring is attached to a ceramic holding part of a fishing line guide, a holder 2b used for supporting a ceramic ring is formed in a shape of a tapered holder with the diameter of an entrance being larger, and the diameter of an exit gradually getting smaller. When a ceramic ring is inserted into the holder, an outer diameter portion of a ceramic ring contacts with a diameter-decreasing part of a holder and is fixed while keeping a central balance, so a centering balance can be obtained. An epoxy adhesive is injected into a tapered gap between an inner surface of a holder and an outer surface contacting with a ceramic ring and is stably solidified. An adhesive injection can be possible in all directions. A light and slim product can be manufactured. A cutting process may be performed for cutting a fishing line guide using a steel plate as well as for forming a holding part for inserting a ceramic ring. So, an efficient manufacture can be possible. An adhering is stable, and an adhered part looks slim and nice.

BRIEF DESCRIPTION OF THE DRAWINGS

The present invention will become better understood with reference to the accompanying drawings which are given only by way of illustration and thus are not limitative of the present invention, wherein;

FIG. 1 is a view illustrating a manufacture process of a fishing line guide according to the present invention;

FIG. 2 is an enlarged view of FIG. 1;

FIG. 3 is a cross sectional enlarged view illustrating a construction that a ceramic ring is attached to a ceramic ring holder according to the present invention; and FIGS. 4A and 4B are cross sectional views of a conventional art.

MODES FOR CARRYING OUT THE INVENTION

The preferred embodiment of the present invention will be described with reference to the accompanying drawings.

First of all, the fishing line guide for a fishing rod according to the present invention comprises a tapered holder 2b which is formed by pressing and expanding a holder 2b formed in a holding part 2a of a ceramic ring of a guide 2, which is formed by cutting a steel plate material 1, in an inner surface of the same, with an entrance having a larger diameter, and a diameter of an exit gradually getting narrower, whereby an epoxy adhesive 5 is injected into an insertion part at regular intervals and is solidified when an inner surface of the holder 2b and a ceramic ring contact with each other by inserting the ceramic ring 3 for thereby attaching the ceramic ring into the interior of the holder.

In addition, the method for manufacturing a fishing line guide for a fishing rod according to the present invention comprises a preparation step for cutting a steel plate material 1 having a certain thickness in a shape of a guide 2; a step for forming a tapered holder 2b by pressing a holder 2b of a holding part 2a to which a ceramic ring is attached, with an entrance having a larger diameter, and a diameter of an exit getting smaller; and a ceramic ring attaching step in which a ceramic ring 3 is inserted into the holder 2b, and an epoxy adhesive 5 is inserted between an inner surface of the holder and the ceramic ring and is solidified.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A method for manufacturing a fishing line guide for a fishing rod, comprising:

a preparation step for cutting a plate having a certain thickness into a guide including a holding part and a fastening part, wherein the holding part is a circular disk having a hole at a center;

a step for forming a ring-shaped holder by pressing and expanding an inner surface of the holding part toward an outer direction along a center axis of the hole such that a first opening is formed at one end of the ring-shaped holder, a second opening having a larger diameter than the first opening is formed at the other end of the ring-shaped holder, and a thickness of the ring-shaped holder is gradually reduced from the second opening to the first opening;

a ceramic ring attaching step for inserting a ceramic ring into the ring-shaped holder, to pass through the second opening, such that the ceramic ring is fixed in contact with an inner surface of the ring-shaped holder in the first opening and is spaced apart from the inner surface of the ring-shaped holder in the second opening; and a step of filling an adhesive in a space between the ceramic ring and the inner surface of the ring-shaped holder in the second opening.

2. The method according to claim 1, wherein the fastening part is formed to extend from the ring-shaped holder for fastening the ring-shaped holder on the fishing rod.

3. The method according to claim 1, wherein the adhesive is made of epoxy resin.

4. The method according to claim 1, wherein the holder is made of steel.

5. The method according to claim 1, wherein a thickness of the adhesive filled in the space between the ceramic ring and the inner surface of the ring-shaped holder is gradually reduced from the second opening toward the first opening.

* * * * *